US006801222B1

(12) United States Patent
Dunham et al.

(10) Patent No.: US 6,801,222 B1
(45) Date of Patent: Oct. 5, 2004

(54) METHOD AND SYSTEM FOR DYNAMICALLY BUILDING APPLICATION HELP NAVIGATION INFORMATION

(75) Inventors: Douglas Paul Dunham, San Jose, CA (US); Duane Neale Barret, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/418,532

(22) Filed: Oct. 14, 1999

(51) Int. Cl.[7] .................................................. G09G 5/00
(52) U.S. Cl. ....................... 345/714; 345/708; 345/713
(58) Field of Search ................................ 345/705, 706, 345/708, 709, 710, 712, 715, 816, 714, 713; 717/174

(56) References Cited

U.S. PATENT DOCUMENTS

| | | | | |
|---|---|---|---|---|
| 5,361,361 A | * | 11/1994 | Hickman et al. | 345/705 |
| 5,535,323 A | * | 7/1996 | Miller et al. | 345/707 |
| 5,877,757 A | * | 3/1999 | Baldwin et al. | 345/705 |
| 6,307,544 B1 | * | 10/2001 | Harding | 345/709 |
| 6,584,496 B1 | * | 6/2003 | Ludtke | 709/217 |
| 6,587,121 B1 | * | 7/2003 | Nelson et al. | 345/705 |
| 6,667,747 B1 | * | 12/2003 | Spellman et al. | 345/714 |

FOREIGN PATENT DOCUMENTS

EP 0407296 1/1991

OTHER PUBLICATIONS

Gavron, Jacquelyn and Moran, Joseph, How to use Microsoft Windows NT 4 Workstation, 1996, Ziff Davis Press, pp. 22–23.*
Gavron, Jacquelyn and Moran, Joseph, How to use Microsoft Windows NT 4 Workstation, 1996, Ziff Davis Press, pp. 22–23.*

* cited by examiner

*Primary Examiner*—John Cabeca
*Assistant Examiner*—Shawn Becker
(74) *Attorney, Agent, or Firm*—Sawyer Law Group LLP

(57) ABSTRACT

The present invention provides a method and system for providing help navigation information for a computer network. The method includes identifying a plurality of registered applications; collecting a plurality of tags from the plurality of registered applications; and organizing the collected plurality of tags to provide a homogeneous, task-oriented help navigation system for the plurality of registered applications. The method provides homogeneous, dynamic help information which reflects the applications installed on a computer system. As applications are installed or removed based on customer needs and licensing changes, the content of the help system changes accordingly. This change occurs transparently to a user. The help information in the help system is organized in a task-oriented manner and displayed in a homogeneous view. Thus, a user is given help information concerning all installed applications involved in the performance of a task without the user needing to know ahead of time what applications have been installed or removed and how these applications relate to the task. This allows the user to obtain the desired help information for a task in an efficient manner.

19 Claims, 4 Drawing Sheets

METHOD AND SYSTEM FOR DYNAMICALLY BUILDING APPLICATION HELP NAVIGATION INFORMATION

FIELD OF THE INVENTION

The present invention relates to computer software, and more particularly to help systems for computer software.

BACKGROUND OF THE INVENTION

Help navigation systems for software help files are well known in the art. Typically, each application has its own help file with its own help navigation system. To view a help file for a particular application, a user runs the application, and then accesses its help file. The help navigation system for the help file assists the user in finding and obtaining the desired information. However, if the user wishes to see the help information for another application, the user must run the other application, access its separate help file, and navigate using the other application'separate help navigation system. This may be cumbersome for the end user, particularly when the task for which the user is seeking information requires the use of more than one application. In this situation, the user must know ahead of time that these other applications exist and that they are involved in the performance of the task. Otherwise, the user will not be able to find all of the help information required to properly perform the task.

Even when a comprehensive help navigation system is provided for a plurality of software applications, the help navigation system is typically static. The help navigation system must know ahead of time what applications will be installed and available to the user. Even if applications are subsequently installed or removed, the help navigation system remains unchanged. The user thus may be navigated to help information for applications which are no longer there or navigated to help information for applications subsequently installed. To obtain the correct information, the user again must know ahead of time what applications exist and whether or not they relate to the task.

Accordingly, there exist a need for a method and system for providing dynamic and task-oriented homogeneous help navigation information for multiple applications. The method and system should increase the ease in which the user may obtain help information to perform a particular task. The present invention addresses such a need.

SUMMARY OF THE INVENTION

The present invention provides a method and system for providing help navigation information for a computer network. The method includes identifying a plurality of registered applications; collecting a plurality of tags from the plurality of registered applications; and organizing the collected plurality of tags to provide a homogeneous, task-oriented help navigation system for the plurality of registered applications. The method provides homogeneous, dynamic help information which reflects the applications installed on a computer system. As applications are installed or removed based on customer needs and licensing changes, the content of the help system changes accordingly. This change occurs transparently to a user. The help information in the help system is organized in a task-oriented manner and displayed in a homogeneous view. Thus, a user is given help information concerning all installed applications involved in the performance of a task without the user needing to know ahead of time what applications have been installed or removed and how these applications relate to the task. This allows the user to obtain the desired help information for a task in an efficient manner.

DETAILED DESCRIPTION

The present invention provides a method for providing dynamic and task-oriented homogeneous help navigation information for multiple applications. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention provides homogeneous, dynamic help navigation information which reflects the applications installed on a computer system. As applications are installed or removed based on customer needs and licensing changes, the content of the help navigation system changes accordingly. This change occurs transparently to a user. The entries in the help navigation system are organized in a task-oriented manner and displayed in a homogeneous view. Thus, a user is navigated to help information concerning all installed applications involved in the performance of a task without the user needing to know ahead of time what applications have been installed or removed and how these applications relate to the task. This allows the user to obtain the desired help information for a task in an efficient manner.

The method in accordance with the present invention is particularly helpful for providing help navigation information for a family of software products, such as the STOR-WATCH family of products (hereinafter "StorWatch"), developed by INTERNATIONAL BUSINESS MACHINES CORPORATION, the assignee of the present application. StorWatch contains a web-based set of applications using JAVA technology where different applications can be installed on a base of common functions, known as the StorWatch Core. The features of present invention will be more particularly described below in the context of StorWatch, however, one of ordinary skill in the art will understand that the present invention may be used with any plurality of applications without departing from the spirit and scope of the present invention.

Figure 1:
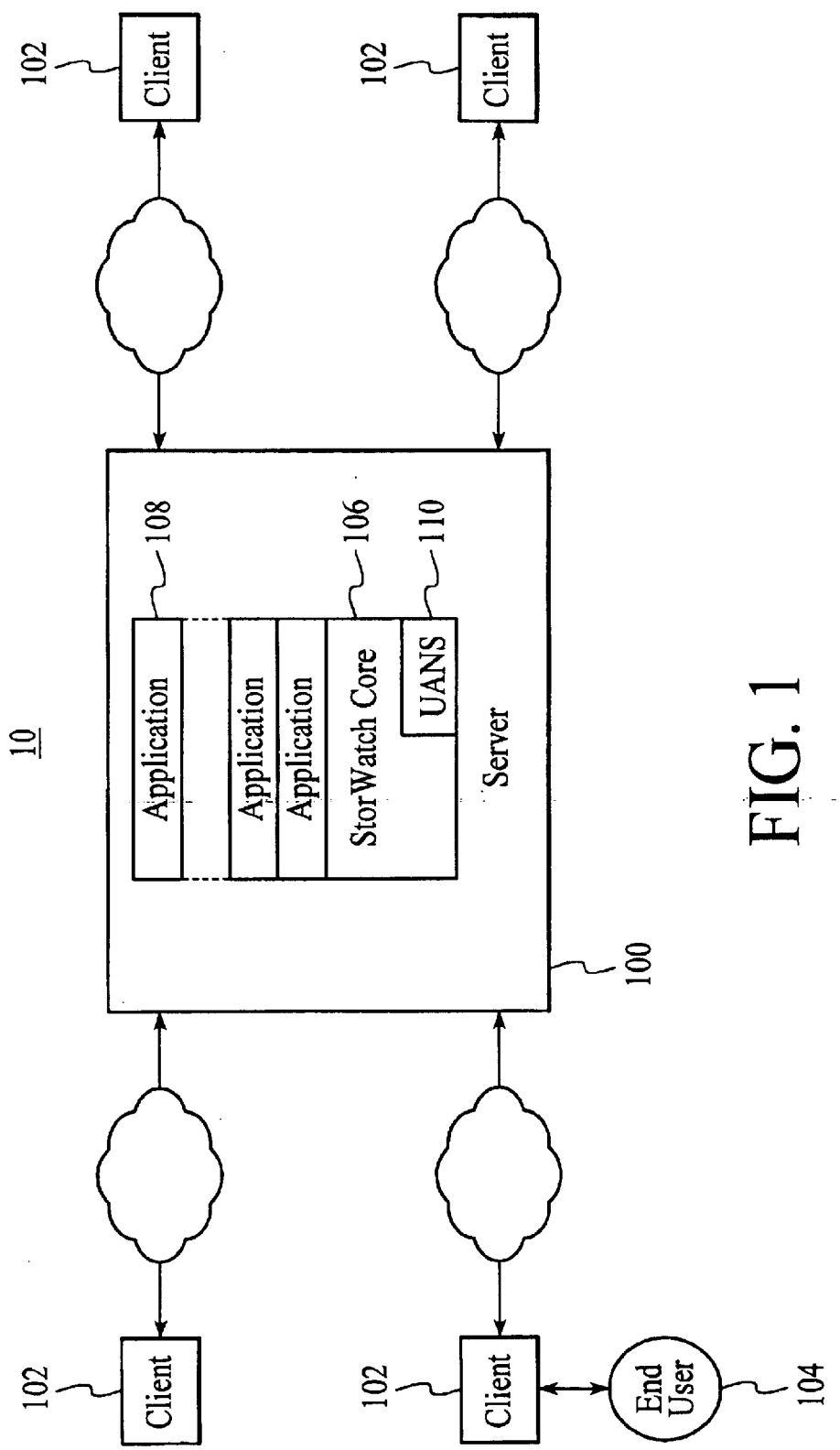
FIG. 1 is a block diagram illustrating a preferred embodiment of a computer network in which a help navigation system is provided in accordance with the present invention.

FIG. 1 is a block diagram illustrating a preferred embodiment of a computer network in which a help navigation system is provided in accordance with the present invention.

The network 10 comprises a server 100 and a plurality of clients 102. An end user 104 may access the server 100 through a client 102. Residing on the server 100 is the StorWatch Core 106. The StorWatch Core 106 is a software which provides a base of common functions. A plurality of applications 108 may be developed to run on top of the StorWatch Core 106, providing extended functionality. When an application 108 is installed, it is placed on a registration list (not shown) of the StorWatch Core 106. When an application 108 is removed, it is removed from the registration list. Each application 108 has its own set of help files, which are preferably in a HTML format. The User Assistance Navigation System 110 (UANS) builds help navigation information for all of the applications 108. This information is displayed in a homogeneous view, allowing the user 104 to navigate through the application's help files in a seamless manner.

Figure 2:
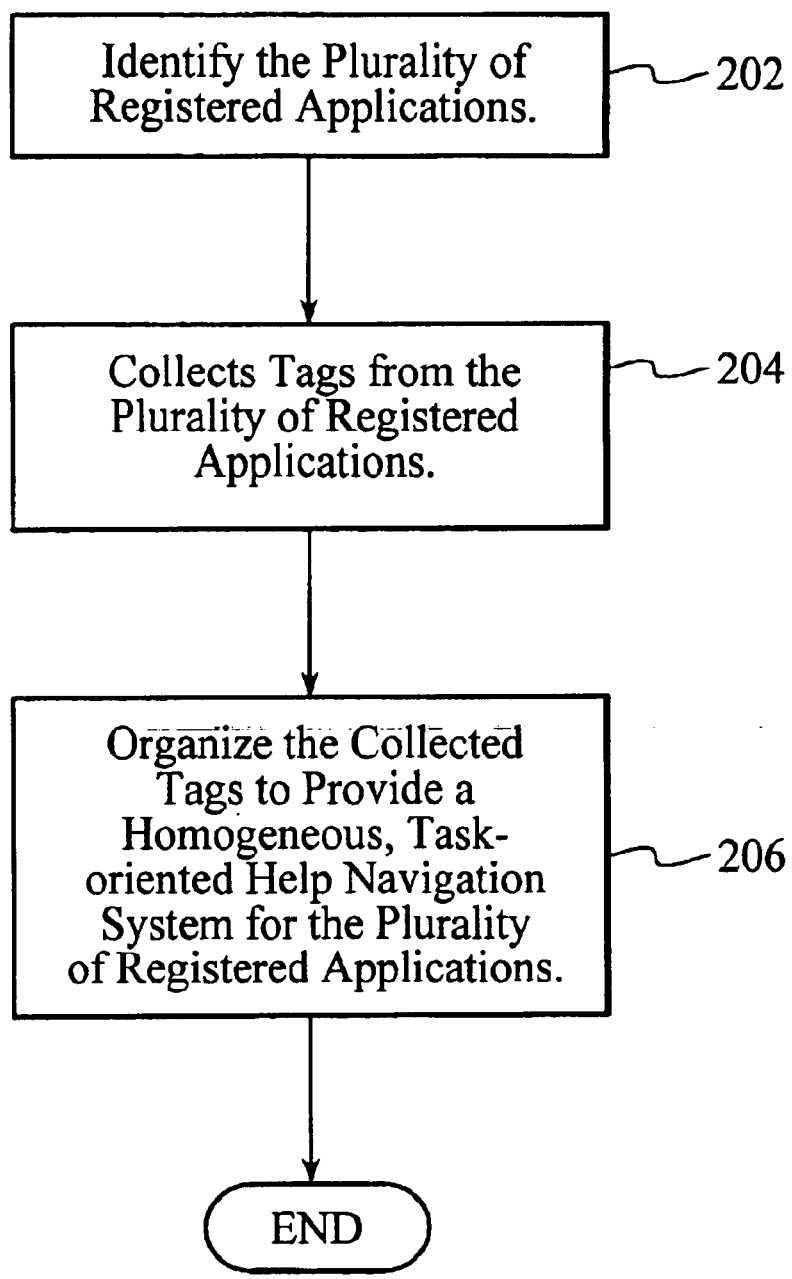
FIG. 2 is a flow chart illustrating a preferred embodiment of a method for providing dynamic and task-oriented integrated help navigation information for multiple applications in accordance with the present invention.

FIG. 2 is a flow chart illustrating a preferred embodiment of a method for providing a dynamic and task-oriented homogeneous help navigation system for multiple applications in accordance with the present invention. Each time an application 108 is installed or removed, the StorWatch Core 106 is reinitialized. When reinitialized, the applications 108 which are registered with the StorWatch Core 106 are identified, via step 202. They are identified from the StorWatch Core's registration list. Each of the applications 108 have help files which contain links to the help information and information on how the tags should be organized by the UANS 110. This organization information is based upon the tasks which a user 104 may perform. Next, the tags are collected from the registered applications 108, via step 204. The UANS 110 scans the HTML help files of the registered applications 108 for the tags imbedded therein and collects them. Then, the collected tags are organized to provide a homogeneous, task-oriented help navigation system, via step 206, according to the organization information therein. The tags from the registered applications 108 are merged and sorted. A file is built containing all of the tag entries and their associated URL links to the correct HTML help file. This file is then used by an applet to present a homogeneous help navigator frame to the users in the StorWatch graphical user interface. Steps 202 through 206 are performed transparently to the user 104.

Figure 3:
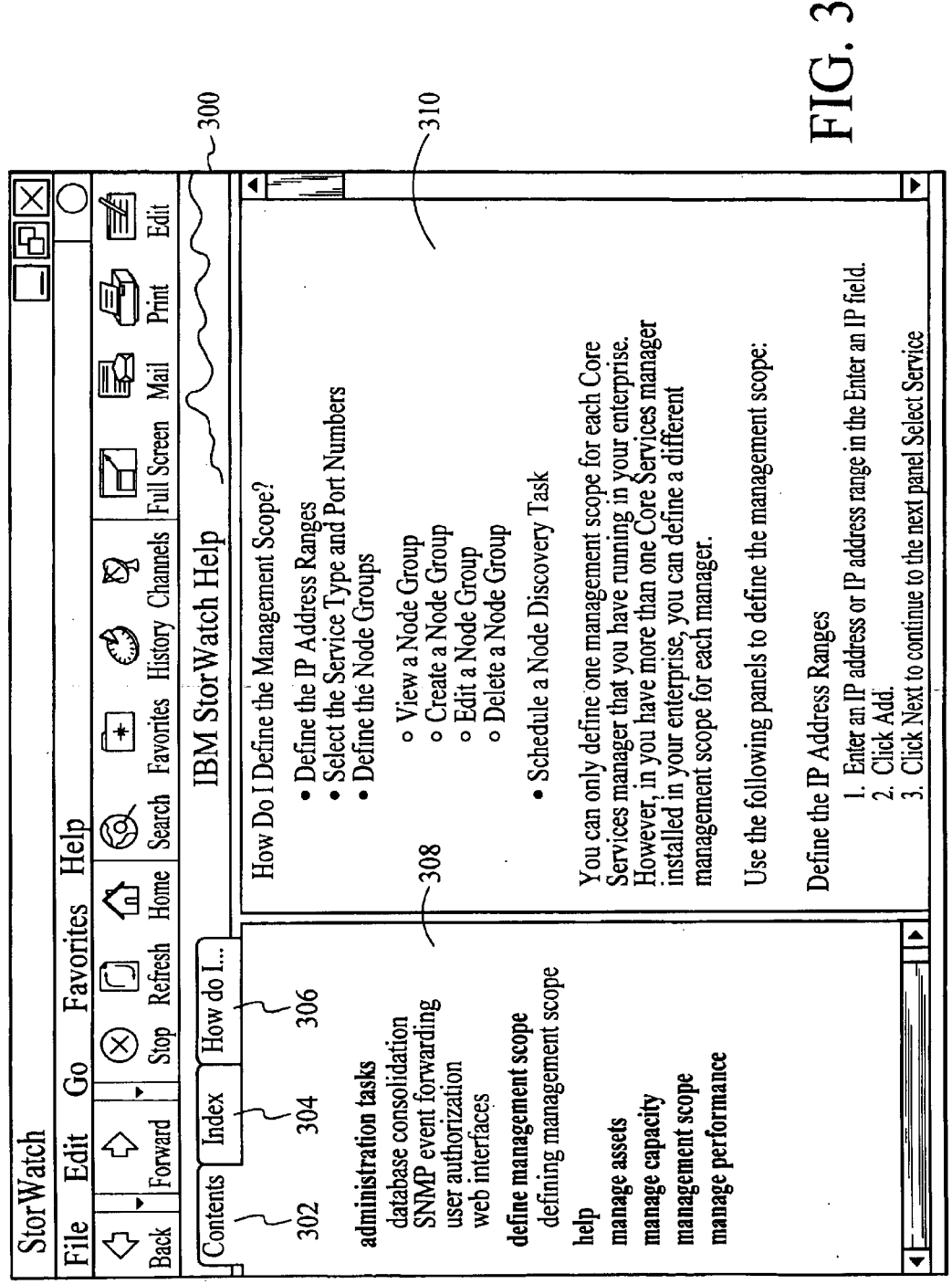
FIG. 3 illustrates an example graphical user interface for displaying help navigation information in accordance with the present invention.

FIG. 3 illustrates an example graphical user interface for displaying the help information built by the UANS 110 in accordance with the present invention. The UANS 110 builds three types of entries that are displayed in a StorWatch window 300: index entries, contents entries, and task help entries (also known as "How Do I . . . " entries). The contents entries are displayed when the "Contents" tab 302 is selected. The Contents list the items that describe the functionality for all of the registered applications 108. The index entries are displayed when the "Index" tab 304 is selected. The Index contains key words and phrases that come from the content of the HTML help files of the registered applications 108. The task help entries are displayed when the "How do I . . . " tab 306 is selected. The "How do I . . . " is used to offer guidance to users 104 about specific tasks that can be performed with the registered applications 108. The left portion 308 of the window 300 displays the navigation information built by the UANS 110, while the right portion 310 of the window 300 displays the text from the appropriate HTML help file. When the user 104 selects a navigation information from the left portion 308 of the window 300, such as the "defining management scope" entry, the user 104 is linked to the appropriate portion; of the HTML help files for the registered applications 108 which pertain to this entry. The URL link to the appropriate portion of the HTML help files are provided by the tags.

In the preferred embodiment, the syntax of an index entry tag is as follow:

| <!-- | @index | LEVEL1 = "level 1 association" [,LEVEL2 = "level 2 association"] [,LEVEL3 = "level 3 association"] [,ANCHOR = "anchor name"] |
|---|---|---|

The first character of the first level of the LEVEL 1 word produces a high level index with the LEVEL 1 entry being the second level entry. "LEVEL 2" specifies the name of the $3^{rd}$ level index entry for this index item. "LEVEL 3" specifies the name of the $4^{th}$ level index entry for this index item. "ANCHOR" specifies the HTML anchor to which this index item should orient. The index entry tags are sorted and merged into a list. The preferred embodiment allows only three levels in index entry tags, but any number of levels may be used without departing from the spirit and scope of the present invention. The index entries are sorted according to the levels in the tags.

For example, a simple index entry is defined to add the name "Sonja" to the index list. The tag is as follows:

| <!-- | @index | LEVEL1 = "dog", LEVEL2 = "Labrador", LEVEL3 = "Sonja", ANCHOR = "#sonja_desc" |
|---|---|---|

The first level of "dog" would produce a high level index of "D", with "dog" being; the second level entry. "Labrador" becomes the third level entry, and "Sonja" becomes the third level entry. "Sonja" is associated with the current HTML file at the point where the anchor tag named "#Sonja_desc" is defined. The index entry generated may look like the following:

D
  dog
    Labrador
      Sonja

"Sonja" is underlined to indicate that it has a link that will display a HTML page. The index entry may also be added to part of a larger index structure, if one already exists.

Another index entry tag may be as follows:

| <!-- | @index | LEVEL1 = "dog", LEVEL2 = "Labrador", LEVEL3 = "Siena", ANCHOR = "#siena_desc" |
|---|---|---|

This tag adds "Siena" as a fourth level index entry which is associated with the current HTML file at the point where the anchor tag named "#siena_desc" is defined. The two index entry tags are merged and sorted, resulting in the following:

```
D
    dog
        Labrador
            Siena
            Sonja
```

In the preferred embodiment, a syntax for a task help entry tag is as follows:

```
<!--  @taskhelp   LEVEL1 = "high level task help phrase"
                  [,LEVEL2 = "level 2 association"]
                  [,LEVEL3 = "level 3 association"]
                  [,LEVEL4 = "level 4 association"]
                  [,ANCHOR = "anchor name"]
```

"LEVEL 1" specifies the name of the highest level associated with this task item. "LEVEL 2" specifies the name of the $2^{nd}$ level task association for this task item. "LEVEL 3" specifies the name of the $3^{rd}$ level task association for this task item. "LEVEL 4" specifies the $4^{th}$ task association for this task item. "ANCHOR" specifies the HTML anchor to which this task item should orient. The task help entry tags are sorted and merged into a list with no alteration to the level hierarchy. The preferred embodiment allows only four levels in task help entry tags, but any number of levels may be used without departing from the spirit and scope of the present invention. The task help entries are sorted according to the levels in the tags.

For example, a task help entry for "Collect Virtual Storage Expert Capacity Data" is defined by the following:

```
<!--  @taskhelp  LEVEL1 = "Capacity management",
                 LEVEL2 = "Collect Visual Storage Expert Capacity
                 Data",
```

In this example, the task help entry is associated with "Capacity Management" in the task list. The associated text is at the top of the current HTML file, so no ANCHOR fields are specified. The resulting entry may look like the following:

Capacity Management
    Collect Visual Storage Expert Capacity Data

The "Collect Visual Storage Expert Capacity Data" is underlined to indicate that it has a link that will display a HTML page.

In the preferred embodiment, a syntax for the contents entries tag is as follows:

```
<!--  @contents   LEVEL1 = "application name"
                  [,LEVEL2 = "level 2 association"]
                  [,LEVEL3 = "level 3 association"]
                  [,LEVEL4 = "level 4 association"]
                  [,ANCHOR = "URL"]
```

"LEVEL 1" specifies the application name associated with the contents item. "LEVEL 2" specifies the name of the highest ($2^{nd}$ level) association for this contents item. "LEVEL 3" specifies the name of the $3^{rd}$ level association for this contents item. "LEVEL 4" specifies the name of the $4^{th}$ level association for this contents item. "ANCHOR" specifies the URL and anchor that this contents item should orient to. The contents entry tags are not sorted but are merged into a list. The anchor contains the fully qualified URL link. The preferred embodiment allows only four levels for contents entry tags, but any number of levels may be used without departing from the spirit and scope of the present invention.

For example, a contents entry for "Reporter Capacity Data" is defined as follows:

```
<!--  @contents  NAME = "Capacity Data",
                 LEVEL1 = "Reporter",
                 ANCHOR = "/StorWatch/apps/Reporter/nls/help/
                 capdat.html#Capdat"
```

The contents entry is associated with "Reporter" in the contents. The associated text is imbedded in the HTML file "capdat.html" at the point where the anchor "#Capdat" is located. The resulting entry may look like the following:

Reporter
    Capacity Data

The "Capacity Data" is underlined to indicate that it has a link that will display a HTML page.

The UANS 110 in accordance with the present invention also allows for internationalization support to enable support for help text in languages other than English.

The UANS 110 supports a directory structure to allow translated help files to be located and associated help text to be displayed. The client 102 locale may be used to determine the proper directory to be accessed for the help files. These directories may be named for the country code as specified by ISO 639. If a locale's language directory doesn't exist; the default help files will be used.

Figure 4:
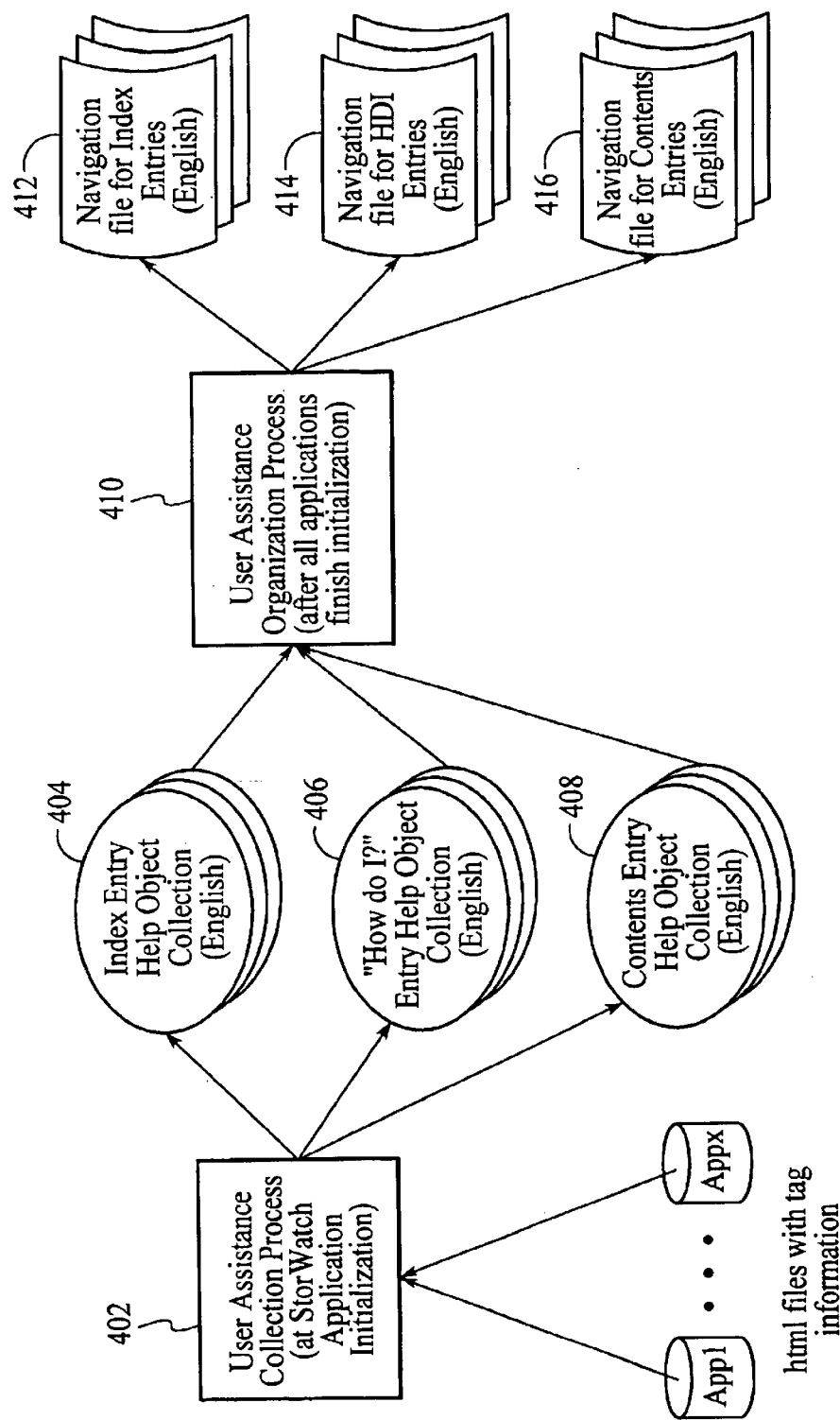
FIG. 4 is a block diagram illustrating a preferred embodiment of an implementation of the help navigation system in accordance with the present invention.

FIG. 4 is a block diagram illustrating a preferred embodiment of an implementation of the UANS 110 in accordance with the present invention. Each application 108 registers itself with the StorWatch Core 106 when it is installed. At the initialization of the StorWatch core 106, the UANS 110 scans each application's help files for help tag information during the User Assistance Collection Process 402. This information is collected into Help Object Collections 404, 406, and 408. Each Help Object Collection contains all of the like tag entries from all of the applications 108 for each language encountered. In the preferred embodiment, there is an Index Entry Help Object Collection 404 for the index entry tags, a "How Do I?" Entry Help Object Collection 406 for the "How Do I . . . " entry tags, and a Contents Entry Help Object Collection 408 for the contents entry tags. During the User Assistance Organization Process 410, each Help Object Collection 404–408 is organized, i.e., sorted and manipulated, and the results are written to navigation files 412, 414, and 416, one for each language encountered. When a particular help type (Contents, Index, or "How Do I . . . ") and topic is selected, the appropriate navigation file 412–416 is opened and read by the StorWatch browser navigation applet. The browser displays help navigation in the client's locale language, if that language translation exists.

A method and system for providing dynamic and task-oriented homogeneous help information for multiple applications has been disclosed. The method in accordance with the present invention provides homogeneous, dynamic help information which reflects the applications installed on a computer system. As applications are installed or removed based on customer needs and licensing changes, the content of the help system changes accordingly. This change occurs transparently to a user. The help information in the help system is organized in a task-oriented manner and displayed in a homogeneous view. Thus, a user is given help information concerning all installed applications involved in the performance of a task without the user needing to know ahead of time what applications have been installed or removed and how these applications relate to the task. This allows the user to obtain the desired help information for a task in an efficient manner.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing help navigation information for a computer network, comprising the steps of:

(a) identifying a plurality of registered applications;

(b) identifying a help file for each of the plurality of registered applications, wherein the help file comprises help information and a plurality of tags embedded with the help information, wherein each tag comprises an anchor and a plurality of leveled entries, wherein the anchor comprises a links to the help information associated with the plurality of leveled entries and the plurality of leveled entries provides hierarchical information pertaining to how the leveled entries are to be organized when displayed within a collection of leveled entries for the plurality of registered applications;

(c) collecting the plurality of leveled entries in the plurality of tags embedded within the help file for each of the plurality of registered applications;

(d) organizing the collected plurality of leveled entries according to the hierarchical information in the plurality of leveled entries to provide homogeneous, task-oriented help navigation information for the plurality of registered applications; and (e) displaying the organized plurality of leveled entries in a homogeneous view, wherein the view allows a user to navigate through the help files for the plurality of registered applications.

2. The method of claim 1, wherein the identifying step (a) comprises:

(a1) installing an application or removing one of the plurality of registered applications, wherein the installing or removing revises a registration list for a core;

(a2) initializing the core; and (a3) identifying the plurality of registered applications from the revised registration list of the core.

3. The method of claim 1, wherein the collected plurality of tags are collected into a plurality of help object collections, comprising:

an index entry help object collection;

a "How Do I?" entry help object collection; and a contents entry help object collection.

4. The method of claim 1, wherein the organizing step (d) comprises:

(d1) sorting or merging the collected plurality of leveled entries according to hierarchical task-oriented organization information in the plurality of leveled entries in the plurality of tags.

5. The method of claim 4, further comprising:

(d2) writing the sorted plurality of leveled entries into a plurality of navigation files, comprising:

a navigation file for index entries;

a navigation file for "How Do I?" entries; and a navigation file for contents entries.

6. The method of claim 1, wherein the plurality of tags for each of the plurality of registered applications is not in a file separate from the corresponding help information for each of the plurality of registered applications.

7. A network, comprising:

a plurality of clients; and a server coupled to the plurality of clients, comprising:

a plurality of applications, a help file corresponding to each of the plurality of applications, wherein the help file comprises help information and a plurality of tags embedded with the help information, wherein each tag comprises an anchor and a plurality of leveled entries, wherein the anchor comprises a links to the help information associated with the leveled entries and the plurality of leveled entries provides hierarchical information pertaining to how the leveled entries tags are to be organized when displayed within a collection of leveled entries for the plurality of registered applications, and a homogeneous, task-oriented help navigation system for the plurality of applications, wherein the help navigation system is provided by:

identifying the plurality of applications;

collecting the plurality of leveled entries in the plurality of tags embedded within the help file of each of the plurality of applications;

organizing the collected plurality of leveled entries according to the hierarchical information in the plurality of leveled entries to provide a homogeneous, task-oriented help navigation system for the plurality of applications; and displaying the organized plurality of leveled entries in a homogeneous view, wherein the view allows a user to navigate through the help files for the plurality of applications.

8. A method for providing help navigation information for a computer network, comprising the steps of:

(a) identifying a plurality of registered applications;

(b) identifying a help file for each of the plurality of registered applications, wherein the help file comprises help information and a plurality of tags embedded with the help information, wherein each tag comprises an anchor and a plurality of leveled entries, wherein the anchor comprises a links to the help information associated with the leveled entries and the plurality of leveled entries provides hierarchical task-oriented information pertaining to how the leveled entries are to be organized when displayed within a collection of leveled entries for the plurality of registered applications;

(c) collecting the plurality of leveled entries in the plurality of tags embedded within the help file for each of the plurality of registered applications;

(d) organizing the collected plurality of leveled entries based upon the hierarchical task-oriented information in the plurality of leveled entries; and (e) displaying the organized plurality of leveled entries in a homogeneous view, wherein the view allows a user to navigate through the help files for the plurality of registered applications.

9. The method of claim 8, wherein the identifying step (a) comprises:

(a1) installing an application or removing one of the plurality of registered applications, wherein the installing or removing revises a registration list for a core;

(a2) initializing the core; and (a3) identifying the plurality of registered applications from the revised registration list of the core.

10. The method of claim 8, wherein the plurality of tags are collected into a plurality of help object collections, comprising:

an index entry help object collection;

a "How Do I?" entry help object collection; and a contents entry help object collection.

11. The method of claim 8, wherein the organizing step (d) comprises:

(d1) sorting and/or merging the collected plurality of leveled entries according to the hierarchical task-oriented organization information in the plurality of leveled entries.

12. The method of claim 11, further comprising:

(d2) writing the sorted plurality of leveled entries into a plurality of navigation files, comprising:
a navigation file for index entries;
a navigation file for "How Do I?" entries; and
a navigation file for contents entries.

13. A method for providing help navigation information for a computer network, comprising the steps of:

(a) installing an application or removing one of a plurality of registered applications, wherein the installing or removing revises a registration list for a core;

(b) initializing the core;

(c) identifying the plurality of registered applications from the revised registration list of the core;

(d) identifying a help file for each of the plurality of registered applications from the revised registration list, wherein the help file comprises help information and a plurality of tags embedded with the help information, wherein each tag comprises an anchor and a plurality of leveled entries, wherein the anchor comprises a links to the help information associated with the leveled entries of the corresponding registered application and the plurality of leveled entries provides hierarchical task-oriented information pertaining to how the leveled entries are to be organized when displayed within a collection of leveled entries for the plurality of registered applications;

(e) collecting the plurality of leveled entries in the plurality of tags embedded within the help file for each of the plurality of registered applications from the revised registration list;

(f) organizing the collected plurality of leveled entries based upon the hierarchical task-oriented information in the plurality of leveled entries; and (g) displaying the organized plurality of leveled entries in a homogeneous view, wherein the view allows a user to navigate through the help files for the plurality of registered applications.

14. The method of claim 13, wherein the scanned plurality of tags are collected into a plurality of help object collections, comprising:

an index entry help object collection;

a "How Do I?" entry help object collection; and a contents entry help object collection.

15. The method of claim 13, wherein the organizing step (f) comprises:

(f1) sorting the collected plurality of leveled entries according to the hierarchical task-oriented organization information in the plurality of leveled entries.

16. The method of claim 15, further comprising:

(f2) writing the sorted plurality of leveled entries into plurality of navigation files, comprising:
a navigation file for index entries;
a navigation file for "How Do I?" entries; and
a navigation file for contents entries.

17. The method of claim 13, further comprising:

(g) receiving a selection of one of the plurality of leveled entries; and (h) obtaining help information linked to by the anchor associated with the selected leveled entry from one of the plurality of help files.

18. A system for providing help navigation information for a computer network, comprising:

means for identifying a plurality of registered applications;

means for identifying a help file for each of the plurality of registered applications, wherein the help file comprises help information and a plurality of tags embedded with the help information, wherein each tag comprises an anchor and a plurality of leveled entries, wherein the anchor comprises a links to the help information associated with the leveled entries and the plurality of leveled entries provides hierarchical information pertaining to how the leveled entries are to be organized when displayed in a collection of leveled entries for the plurality of registered applications;

means for collecting the plurality of leveled entries in the plurality of tags embedded within the help file for each of the plurality of registered applications;

means for organizing the collected plurality of leveled entries according to the hierarchical information in the plurality of leveled entries to provide a homogeneous, task-oriented help navigation system for the plurality of registered applications; and displaying the organized plurality of leveled entries in a homogeneous view, wherein the view allows a user to navigate through the help files for the plurality of registered applications.

19. A computer readable medium with computer instructions for providing help navigation information, the instructions for:

(a) identifying a plurality of registered applications;

(b) identifying a help file for each of the plurality of registered applications, wherein the help file comprises help information and a plurality of tags embedded with the help information, wherein each tag comprises an anchor and a plurality of leveled entries, wherein the anchor comprises a links to the help information associated with the leveled entries and the plurality of leveled entries provides hierarchical information pertaining to how the leveled entries are to be organized when displayed within a collection of leveled entries for the plurality of registered applications;

(c) collecting the plurality of leveled entries in the plurality of tags embedded within the help file for each of the plurality of registered applications;

(d) organizing the collected plurality of leveled entries according to the hierarchical information in the plurality of leveled entries to provide homogeneous, task-oriented help navigation information for the plurality of registered applications; and (e) displaying the organized plurality of leveled entries in a homogeneous view, wherein the view allows a user to navigate through the help files for the plurality of registered applications.

* * * * *